United States Patent Office 2,964,417
Patented Dec. 13, 1960

2,964,417

MULTICOLOR COATING COMPOSITIONS

Alton J. Ward, Miami, Fla., assignor, by mesne assignments, to Airkem, Inc., New York, N.Y., a corporation of New York No Drawing. Filed Sept. 14, 1959, Ser. No. 839,576

23 Claims. (Cl. 106—170)

This invention relates to coating compositions for imparting to surfaces in a single spray application, continuous enveloping films having embedded therein a plurality of discrete and suitably colored particles whereby an almost limitless number of different multi-tone and/or multi-color coating effects can be produced. The present application is a continuation-in-part of my prior application Serial No. 731,634, filed April 29, 1958, now abandoned.

Multi-color paints and coating compositions are known in the art, but heretofore such compositions, when capable of producing a multi-color effect in a single application, have consisted of aqueous dispersions or emulsions with colored lacquers or paint forming the disperse phase in an aqueous carrier. Coatings produced from such prior art compositions provide essentially discontinuous films or deposits, providing incomplete protection of coated surfaces and poor resistance to water, abrasion and exposure to the elements. Certain of such aqueous emulsions are also subject to bacterial attack.

The novel coating compositions in accordance with the present invention differ from previously known multi-color coating compositions in employing two type film formers, one of which forms the continuous phase of the composition, and the other of which forms the disperse phase, and the compositions when applied to surfaces by spraying, form continuous films with particles of the disperse phase being enveloped by and distributed in random fashion in said continuous film. When prepared in accordance with the procedures hereinafter described, the novel coating compositions can be stored indefinitely in conventional unlined paint containers with the disperse phase remaining fluidized in the continuous phase.

Coatings formed with such compositions are essentially water-proof, highly durable, showing resistance to attack by alcohol, boiling water, salt spray, oil, detergent, bacteria and most chemicals. The coatings also have excellent flame resistance and high flexibility, although these factors and others, such as hardness, and the like, can be modified by appropriate selection of film formers in the continuous and disperse phase, and proper use of compatible plasticizers and modifiers for the film formers.

The coating compositions can be applied effectively to a variety of surfaces, including wood, metal, glass, plaster, fabrics, and many plastics, and in such application, can be deposited as a thin film or layer, or can be built up to a layer of substantial thickness wherein particles of the disperse phase may be deposited in a plurality of superimposed layers. It is also possible to form with the novel compositions, plastic films which may be utilized as such for various purposes, as for example, by spraying with a desired composition on glass, stainless steel, or other smooth surface to which a thin oil film has been applied to cut down adhesion. The coating can then be sprayed to the desired thickness, and after drying, can be peeled from the support. Plastic films can be thus produced in any desired color, or color combination, and in varying degrees of translucency. One practical use of such films would be for ornamental lamp shades, and the like.

Regarded in certain of its broader aspects, the present invention embodies a film former composition for use in the spray application of multi-color organic coatings, said composition consisting essentially of a carrier vehicle wherein a first film former is dissolved in a predominately hydrocarbon first organic solvent mixture, said carrier vehicle having dispersed therein particles of random size and shape consisting essentially of a second type film former which is substantially insoluble in hydrocarbon solvents, and a residue of solvents from a lacquer vehicle initially consisting essentially of a solution of said second type film former in a second organic solvent mixture of oxygenated lacquer solvent and substantial but compatible amounts of hydrocarbon solvent, the size and shape of said particles being dependent in part upon a combination of the viscosity of said second type film former and the speed of agitation of said carrier vehicle as the lacquer vehicle is poured into said carrier vehicle to form said particles.

In the formation of dispersed particles, the second type film former is thrown out of solution, apparently due to the migration of solvents from the lacquer vehicle to the carrier vehicle on mixing. A substantial amount of solvent originally present in the lacquer vehicle, however, remains associated with the dispersed particles, since these particles, although discrete and separated one from the other by the carrier vehicle, remain soft and pliable, so that they tend to spread out and flatten when sprayed on a surface.

Furthermore, the particles which may be of substantial size as initially formed, can be reduced in size to any desired extent by suitably controlling the speed and duration of the agitation of the mixture.

While the particles of the dispersed phase may gradually settle if the container of composition is allowed to stand for an extended period, these particles remain separated one from the other by the carrier vehicle, and even after standing for several months, the particles so settled will pour freely away from the bottom of the container by merely inverting the same, and can be uniformly redispersed by slight shaking or stirring of the mixture.

Multi-tone effects can be obtained with the novel compositions even when using a clear carrier vehicle and clear lacquer vehicle in preparing the composition, since upon spraying on a surface, the dispersed particles take on an opacity when drying which contrasts with the clear film formed upon drying of the clear carrier vehicle. Suitably, however, at least one of the vehicles will contain a coloring agent. In this connection, it should be understood that the coloring agent when applied to either vehicle, remains with the film former originally contained in that vehicle. Thus, a coloring agent added to the lacquer vehicle colors only the dispersed particles, whereas the coloring agent added to the carrier vehicle colors the continuous film formed by the carrier vehicle. Since such continuous film envelops the dispersed particles, the coloring agent present only in the carrier vehicle will coat the dispersed particles to thereby impart a two-tone or textured appearance to the colored continuous film.

The great flexibility in use and application provided by the novel coating compositions, however, stems from the use of two or more differently colored lacquer vehicles in the formulation of the compositions with the resultant formation of differently colored dispersed particles. The preparation of such multi-color coating compositions can be effected in a single mixing vessel by pouring in two or more streams of differently colored lacquer vehicle while suitably agitating the carrier vehicle and resulting mixture. In other words, the separation or formation of the particles is instantaneous when mixing, and so long as the differently colored streams of lacquer vehicle do not mix before entering the carrier vehicle, there will be no blending of color, but rather a formation of differently colored particles.

Multi-color coating compositions can also be prepared, however, by mixing together two or more of such compositions which have been preformed to contain colored particles or mixtures of colored particles. This approach is of peculiar advantage in formulating compositions which will have unusual combinations of colors and/or shapes in the colored particles. Furthermore, it enables more precise control of the uniformity in particle size in various colors when attempting to reproduce a particular design. Thus, for example, if it were desired that a pattern, obtained by spraying the composition, were to contain a mixture of relatively large flakes of one color, relatively small flakes of another color, and elongated strands of a third color, it is sometimes desirable to separately mix the different lacquer vehicles with portions of the carrier vehicle, agitating each mixture separately to provide the particle size desired, and then to combine the several mixtures with mild agitation merely sufficient to uniformly blend or mix the dispersed particles. The form or general shape of the particles produced depends primarily on a combination of the viscosity of the film former in the lacquer vehicle and the solids content of the lacquer vehicle. Thus, for example, by using a lacquer vehicle having high viscosity film former and a low solids content, the particles produced tend to be of a shred-like or fibrous character. On the other hand, if the lacquer vehicle has a low viscosity film former and a high solids content, the particles produced will tend to be more in the form of flakes or irregularly contoured films. The size of the particular shred-like or flake-like particles as initially formed will depend primarily on the speed of agitation, slower agitation will produce larger particles, higher speed of agitation, or prolonged agitation at moderate speed, will diminish the size of the particles while retaining the characteristic flake-like or shred-like nature of the particles.

Many different combinations of first type film former and second type film former can be used in preparing compositions in accordance with the present invention. Broadly, the two type film formers must differ in their solubility characteristics, with the first type film former of the carrier vehicle being more readily soluble in what are generally considered the weaker solvents, such as predominately hydrocarbon solvents, and with the second type film former of the lacquer vehicle requiring substantial amounts of conventional oxygenated lacquer solvents, such as alcohol, ethers and ketones. The key to preparing the novel coating compositions appears to be the utilization of a lacquer vehicle which has been diluted or extended with near maximum compatible amounts of the weaker hydrocarbon solvents. When the lacquer vehicle is then mixed with the carrier vehicle, a portion of the stronger lacquer solvent migrates to the carrier vehicle, reducing the proportion of lacquer solvent in the carrier vehicle to a proportion insufficient to maintain the second type film former in solution, with the result that the second type film former precipitates as a particle dispersed in the carrier vehicle.

The soundness of the foregoing explanation is believed to be demonstrated by the fact that if a lacquer solvent, such as methyl ethyl ketone is added to the finished multicolor coating composition in suitable amounts, the particles will re-dissolve, and form what is in effect a new lacquer vehicle of the blended color. This new lacquer vehicle can then be added with stirring to fresh carrier vehicle to again form dispersed particles, this time colored in accordance with the blended color of such new lacquer vehicle.

The novel method of thus re-dissolving the dispersed particles by the addition of appropriate amounts of a lacquer solvent, such as methyl ethyl ketone, suggests a special advantage in compositions according to the present invention quite apart from the multi-color coating aspects thereof. As previously mentioned, the dispersed particles, although settling upon standing in a container, remain fluidized in the carrier vehicle and can be very readily dispersed therein. This is in considerable contrast to the troublesome settling of solids and pigments which is experienced with certain paints and lacquers. It would appear that the problem of settling could be advantageously handled by providing coating compositions even for brush application in the form of carrier-dispersed particle mixtures in accordance with the present invention, with the understanding that a specified amount of appropriate lacquer solvent would be added with mild agitation to re-dissolve the dispersed particles and prepare the coating composition for use.

Compositions initially prepared in accordance with the present invention and still considered of primary importance from the standpoint of versatility in different uses and applications of the invention, are compositions in which the first type film former in the carrier vehicle is a cellulose acetate butyrate suitably containing about 50% of combined cellulose residue, 37% of combined butyryl, and 13% of combined acetyl with about 20% free hydroxyl in the cellulose residue. Such cellulose acetate butyrate is commercially available as type EAB-381, and is available in various viscosities, including in particular, the ½ second butyrate and the 20 second butyrate EAB-381-20. In such compositions, the second type of film former of the lacquer vehicle is preferably a nitrocellulose containing about 11.8 to 12.2% nitrogen and commercially available as R.S. type nitrocellulose in various viscosities, including in particular, R.S. ¼ second, R.S. ½ second, R.S. 5 to 6 seconds, R.S. 15 to 20 seconds and higher viscosities.

This invention, however, is by no means restricted to this particular combination of film formers, and it is possible to prepare coating compositions in accordance with the present invention with various thermo-plastic and thermosetting film formers as the primary or supplemental film former or film builder in the carrier vehicle and in the lacquer vehicle. The important factor in any selection of film former, as previously pointed out, is that a film former or mixture of film formers in the continuous phase should be readily soluble in the weaker or predominately hydrocarbon solvents while the film former or mixture of film formers in the lacquer vehicle should require substantial amounts of stronger lacquer solvents in order to prepare solutions thereof.

It is possible, for example, to prepare compositions in accordance with the present invention with both the external and internal phase containing predominately nitrocellulose film formers. In such event, one would employ for the external phase, a nitrocellulose of lower nitrogen content, as for example, nitrocellulose containing 10.7 to 11.2 nitrogen, such as is commercially available as SS type nitrocellulose. This possibility, however, is considered rather academic, since the use of ntirocellulose in the continuous or external phase would be impractical due to increased flammability of the resulting film. When R.S. type nitrocellulose is used in the disperse phase and cellulose acetate butyrate in the continuous or external phase, the enveloping film of cellulose acetate butyrate renders the resulting film highly resistant to fire and flame.

It is also possible to employ cellulose acetate butyrate as the film former in both the internal and external phase by substituting for the R.S. type nitrocellulose, cellulose acetate butyrate containing about 53.5% combined cellulose residue, 17% combined butyryl, 29.5% combined acetyl, and about 1.5% free hydroxyl in the cellulose residue. Such high acetyl-low butyryl material is commercially available as cellulose acetate butyrate type EAB-171, and is available in varying viscosities from about 2 seconds to 40 seconds. The use of such cellulose acetate butyrate in the internal or disperse phase has the dual advantage of providing greater fire and flame resistance and reducing capillary penetration of moisture which can occur through dispersed particles of nitrocellulose, particularly when using thin coatings or applications of the composition.

Substitutions of film former, particularly in the external or continuous phase can also be made with particular regard for the physical properties desired in films produced by the compositions. Thus, for example, when highly flexible films are desired, one can employ as the primary film former of the external phase, chlorinated natural rubber, such for example, as products commercially available in various viscosities under the trademark "Parlon." A peculiarity of Parlon as a film former is that it does not remain as clear and water-white as cellulose acetate butyrate.

Another type of film former which can be used in the external phase, particularly where flexible and rubbery films are desired, are the polymerized ester derivatives of acrylic and methacrylic acid such as ethyl acrylate, including products commercially available under the trademark "Acryloid." Particularly suitable are Acryloid B-72 which is a general purpose acrylic ester resin, Acryloid B-82 which is similar to B-72, but less tolerant to weaker solvents, and Acryloid A-10 which is a harder and more solvent-resistant resin.

In instances where a particularly hard finish is desired in a coating or application, one can include in the external or continuous phase a substantial proportion of urea formaldehyde or other thermo-setting resin, and then subject the coating to heat treatment to accelerate curing and hardening of such resin. It will also be understood that various compatible plasticizers and modifiers can be associated with the film formers in both the internal and external phase to develop in films formed from the composition, particular physical properties or combinations of properties which might be desired.

As coloring agents for the disperse phase, one can use any of the organic or inorganic pigments, or combinations thereof, normally employed for providing desired shades and tones in conventional lacquers. Such pigments may be of the dry type, or they may be pre-dispersed in an alkyd resin solution or other resin conventionally used for dispersing pigments. Furthermore, pigments or pigment blends may be used in quantities varying from about 2 ounces per gallon to about 2 pounds per gallon of lacquer vehicle, depending upon the degree of transparency or opacity desired. Typical examples of pigments which have been used in providing unique effects with the multi-color coating compositions, include:

| Color: | Pigment |
| --- | --- |
| White | Titanium dioxide. |
| Black | Carbon black or lamp black. |
| Blue | Phthalocyanine blue, ultramarine blue. |
| Green | Medium chrome green, dark chrome green, phthalocyanine green. |
| Red | Cadmium red. |
| Orange | Molybdate orange. |
| Yellow | Medium chrome yellow, light chrome yellow. |
| Maroon | Alizarine-maroon. |
| Brown | Burnt umber (oxide brown), ferrite yellow (oxide yellow), oxide red. |
| Metallic effects | Gold or bronze powders, aluminum powders, gold tone aluminum foil "flitters" particles. |

In addition to the foregoing, and particularly to obtain more transparent colors, one can employ various of the non-bleeding dyes, i.e. those which show no migration of color between successive films of different color.

It will be recognized that coating compositions in accordance with the present invention are quite viscous in nature, particularly when the particles of disperse phase are relatively large and numerous. For this reason, it is important, when spraying, to employ an atomizing air pressure of about 25 to 50 pounds and a pot pressure of about 10-25 pounds. Furthermore, the atomizer head should preferably provide but two air jets, since the purpose in spraying is to merely propel and distribute the preformed particles of disperse phase along with the continuous phase and without substantial breakage or subdivision of the particles.

It will be understood, however, that when employing compositions in which the particles of disperse phase are sufficiently small, the compositions can be effectively sprayed at substantially lower pressure, and can even be packaged and dispensed in aerosol containers, using the normal aerosol repellants. In such instances, of course, the discharge orifice of the aerosol valve must be of a size to permit free passage of the maximum size particles of the disperse phase.

The following examples will serve to show how various coating compositions in accordance with the present invention can be prepared, but it is to be understood that these examples are given by way of illustration and not of limitation.

*Example I*

A carrier vehicle was prepared containing:

| | Parts by weight |
| --- | --- |
| Toluol | 65.01 |
| Isopropyl alcohol | 8.53 |
| Xylol | 1.82 |
| Camphor gum | 2.50 |
| Castor oil | .25 |
| Cellulose acetate butyrate (EAB-381-20) | 2.76 |
| Cellulose acetate butyrate (EAB-381-½) | 5.04 |
| Castor oil modified alkyd resin | 10.80 |
| Lacquer diluent naphtha | 3.29 |
| | 100.00 |

Weight per gallon 7.25 pounds.
Viscosity "D," Gardner-Holdt.

A lacquer vehicle was prepared containing:

| | Parts by weight |
| --- | --- |
| Toluol | 34.50 |
| Xylol | 4.00 |
| Lacquer diluent naphtha | 10.00 |
| ¼ sec. nitrocellulose, R.S. type | 15.00 |
| Polyethylene glycol di-2-ethylhexoate plasticizer | 2.50 |
| Butyl alcohol | 6.00 |
| Methyl isobutyl ketone | 10.00 |
| Butyl cellosolve | 4.00 |
| Methyl ethyl ketone | 14.00 |
| | 100.00 |

Weight per gallon 7 pounds.
Viscosity—Gardner A-3.

The above lacquer vehicle example is given only for the purpose of explanation of the process and is a usual or ordinary commercial lacquer formula with deletion of resins; such formulas may be varied or changed by different manufacturers of commercial lacquer. However, the viscosity of the nitrocellulose as contained in such formula is of utmost importance; by varying the viscosity of the nitrocellulose used in the formula, the shape and size of the discrete colored particles obtained by this invention are changed and varied. By the use of 15-20 second nitrocellulose the discrete colored particles are of a fibrous composition and appear in the finished produce as fibrous particles of color of small diameter and length. By the use of ¼ second nitrocellulose in the lacquer vehicle the discrete colored particles obtained are more as spots or flakes of color varying in shape and size according to the speed of agitation at the time of mixing. The use of any commercial lacquer containing resins will produce a like effect, but when sprayed, will leave a rough textured finish, also the lack of knowledge as to the viscosity of the nitrocellulose in such commercial lacquers prevents the control of the particles as above outlined. Lacquer diluent naphtha is a light petroleum solvent naphtha having the following properties:

| | |
|---|---:|
| Gravity, ° API | 60.0 |
| Sp. gr., 60/60° F. | 0.739 |
| ASTM distillation: | |
|    Initial B.P. _____°C__ | 92 |
|    50% _____°C__ | 105 |
|    End point _____°C__ | 128 |
| Evaporation time at 25° C. in minutes: | |
|    20% | 3.4 |
|    50% | 9.6 |
|    80% | 17.7 |
|    95% | 23.5 |

To one gallon portions of the lacquer vehicle are added one pound of white (titanium dioxide), black (carbon black) and gray (mixed titanium dioxide and carbon black) pigments respectively, providing a white lacquer, a gray lacquer and a black lacquer. The pigments had been predispersed in a non-drying oil modified alkyd resin. For a 5 gallon batch of gray, white and black multi-colored paint, 4.25 gallons of the clear carrier vehicle are placed in a container, stirred at 800 r.p.m. and three pints white lacquer, 1 quart gray lacquer and 1 pint of black lacquer are slowly poured into the carrier vehicle in separate streams. The lacquers are poured in a stream of about 1/16 to 3/32 inch in diameter. Because of the immiscibility of the two vehicles, the colors do not mix but are in the form of small shreds of color.

The above explanation gives a specific method of mixing and forming the multi-colored coating. However, the speed of mixing and size of streams poured into the carrier vehicle may be varied greatly to provide different effects. The amount of pigment placed in the lacquer may vary from 2 ounces to 2 pounds per gallon depending upon the effect desired. The coating is applied by spraying utilizing 10-25 pounds pot pressure and 25-50 pounds atomizing air pressure. The coating dries to touch in about 20 minutes, tact free within two hours and to ultimate hardness in 25 to 40 hours. The multi-colored coating is resistant to alcohol, boiling water, salt spray, oil, detergents, 10% sulfuric acid, 10% NaOH, 10% acetic acid and 10% sodium carbonate.

The composition coating material may be used over primed or unprimed surfaces, of wood, steel, aluminum, fabrics, plastics, paper products, concrete, and glass, providing the glass has been properly cleaned before application, preferably with aqueous ammonia.

The following additional examples illustrate formulations for carrier vehicles, such carrier vehicle examples to be selected for their ultimate use on different surfaces.

*Example II*

| | Parts by weight |
|---|---:|
| Toluol | 78.65 |
| Camphor gum | 2.25 |
| Castor oil | .50 |
| Cellulose acetate butyrate (EAB-381-½) | 4.80 |
| Cellulose acetate butyrate (EAB-381-20) | 3.00 |
| Rosin modified alkyd resin | 10.80 |
| | 100.00 |

*Example III*

| | Parts by weight |
|---|---:|
| Butyl Cellosolve | .50 |
| Xylol | 1.30 |
| Toluol | 66.00 |
| Ethyl alcohol | .40 |
| Isopropyl alcohol | 5.00 |
| L.D. naphtha | 2.00 |
| High flash naphtha | 1.00 |
| Dibutyl phthalate | 2.75 |
| Cellulose acetate butyrate (EAB-381-½) | 5.30 |
| Cellulose acetate butyrate (EAB-381-20) | 3.40 |
| Rosin ester | 12.00 |
| Silicone DC-200 (polydimethyl siloxane) | .35 |
| | 100.00 |

*Example IV*

| | Parts by weight |
|---|---:|
| Butyl Cellosolve | .45 |
| Xylol | 4.00 |
| Toluol | 62.10 |
| Ethyl alcohol | 2.10 |
| Isopropyl alcohol | 4.25 |
| L.D. naphtha | 1.75 |
| High flash naphtha | 2.40 |
| Dioctyl phthalate | .20 |
| Acetyl triheptyl citrate | 2.00 |
| Dioctyl adipate | .60 |
| Triphenyl phosphate | .25 |
| Cellulose acetate butyrate (EAB-381-½) | 3.60 |
| Cellulose acetate butyrate (EAB-381-20) | 3.00 |
| Methyl methacrylate | 12.00 |
| Urea-formaldehyde | 1.30 |
| | 100.00 |

*Example V*

| | Parts by weight |
|---|---:|
| Butyl Cellosolve | .25 |
| Xylol | 1.00 |
| Toluol | 70.00 |
| Ethyl alcohol | 4.50 |
| High flash naphtha | 1.25 |
| Camphor gum | 2.00 |
| Dicyclohexyl phthalate | .40 |
| Dioctyl phthalate | .70 |
| Cellulose acetate butyrate (EAB-381-½) | 5.70 |
| Cellulose acetate butyrate (EAB-381-20) | 3.35 |
| Rosin ester | 3.25 |
| Hydrocarbon (L.D. naphtha) | 3.50 |
| Urea-formaldehyde resin | 4.00 |
| | 100.00 |

*Example VI*

| | Parts by weight |
|---|---:|
| Butyl Cellosolve | .60 |
| Xylol | 1.50 |
| Toluol | 67.00 |
| Ethyl alcohol | 5.50 |
| Isopropyl alcohol | 1.80 |
| L.D. naphtha | .80 |
| High flash naphtha | .75 |
| Castor oil | .30 |
| Dioctyl phthalate | 1.90 |
| Dioctyl adipate | .80 |
| Cellulose acetate butyrate (EAB-381-½) | 5.90 |
| Cellulose acetate butyrate (EAB-381-20) | 2.25 |
| Polyvinyl acetate | 9.00 |
| Hydrocarbon (L.D. naphtha) | 1.90 |
| | 100.00 |

Example VII

| | Parts by weight |
|---|---|
| Xylol | 2.25 |
| Toluol | 64.90 |
| Ethyl alcohol | 1.80 |
| Isopropyl alcohol | 2.75 |
| L.D. naphtha | 2.60 |
| High flash naphtha | .50 |
| Camphor gum | 3.00 |
| Dicyclohexyl phthalate | 1.20 |
| Triphenyl phosphate | .40 |
| Cellulose acetate butyrate (EAB–381–½) | 7.10 |
| Cellulose acetate butyrate (EAB–381–20) | 1.80 |
| Alkyd resin | 1.20 |
| Silicone resin (polymethyl phenyl siloxane) | 7.50 |
| Ethylene glycol-resin ester | 3.00 |
| | 100.00 |

In the foregoing examples high flash naphtha has a flash point of about 130°.

The following examples illustrate suitable lacquer vehicles for use with the carrier vehicles of Examples I–VII:

Example VIII

| | Parts by weight |
|---|---|
| Butyl Cellosolve | 3.50 |
| Toluol | 39.00 |
| L.D. naphtha | 7.00 |
| ¼ second nitrocellulose, R.S. type | 10.00 |
| ½ second nitrocellulose, R.S. type | 4.00 |
| Dioctyl phthalate | 3.00 |
| Butyl alcohol | 9.00 |
| Methyl isobutyl ketone | 11.00 |
| Methyl ethyl ketone | 13.50 |
| | 100.00 |

Example IX

| | Parts by weight |
|---|---|
| Butyl Cellosolve | 3.00 |
| Toluol | 33.00 |
| Xylol | 7.50 |
| L.D. naphtha | 2.25 |
| ¼ second nitrocellulose, R.S. type | 4.00 |
| 5–6 second nitrocellulose R.S. type | 7.00 |
| Dioctyl phthalate | 1.25 |
| Castor oil | 1.00 |
| Soya modified alkyd resin | 8.00 |
| Butyl alcohol | 8.00 |
| Methyl isobutyl ketone | 9.00 |
| Butyl acetate | 5.00 |
| Methyl ethyl ketone | 1.00 |
| Isopropyl acetate | 10.00 |
| | 100.00 |

Example X

| | Parts by weight |
|---|---|
| Butyl Cellosolve | 2.75 |
| Toluol | 35.00 |
| Xylol | 5.00 |
| L.D. naphtha | 3.75 |
| ¼ second nitrocellulose, R.S. type | 12.00 |
| 5–6 second nitrocellulose, R.S. type | 2.00 |
| Dioctyl phthalate | 3.00 |
| Methyl methacrylate | 7.00 |
| Alkyd castor | 2.50 |
| Butyl alcohol | 3.00 |
| Methyl isobutyl ketone | 3.00 |
| Butyl acetate | 8.00 |
| Methyl ethyl ketone | 7.00 |
| Isopropyl acetate | 6.00 |
| | 100.00 |

Example XI

| | Parts by weight |
|---|---|
| Butyl Cellosolve | 3.25 |
| Toluol | 36.40 |
| Xylol | 2.25 |
| L.D. naphtha | 7.00 |
| ¼ second nitrocellulose, R.S. type | 5.00 |
| ½ second nitrocellulose, R.S. type | 5.00 |
| 5–6 second nitrocellulose, R.S. type | 2.00 |
| Dioctyl phthalate | .75 |
| Dibutyl phthalate | 1.25 |
| Castor oil | .50 |
| Rosin ester | 5.00 |
| Alkyd resin | 4.00 |
| Butyl alcohol | 3.50 |
| Methyl isobutyl ketone | 9.00 |
| Butyl acetate | 2.00 |
| Methyl ethyl ketone | 13.00 |
| | 100.00 |

Example XII

| | Parts by weight |
|---|---|
| Butyl Cellosolve | 2.00 |
| Toluol | 37.00 |
| Xylol | 2.00 |
| L.D. naphtha | 1.00 |
| ¼ second nitrocellulose, R.S. type | 8.00 |
| ½ second nitrocellulose, R.S. type | 3.00 |
| 5–6 second nitrocellulose, R.S. type | 3.00 |
| Polyethylene glycol plasticizer | 1.00 |
| Dioctyl phthalate | 1.00 |
| Dibutyl phthalate | .50 |
| Alkyd resin | 8.50 |
| Castor oil modified alkyd resin | 3.00 |
| Butyl alcohol | 5.00 |
| Methyl isobutyl ketone | 10.00 |
| Butyl acetate | 1.00 |
| Methyl ethyl ketone | 14.00 |
| | 100.00 |

All parts are by weight in the examples. The term "alkyd resin" in the examples refers to unmodified glycerol-phthalic acid alkyd.

The following example illustrates the preparation of a marbleized coating composition in which the carrier vehicle itself is also pigmented:

Example XIII

To 4.38 gallons of the clear carrier vehicle of Example II is added 2 ounces ferrite yellow and one ounce of molybdate orange. To this colored carrier vehicle is added three pints of white (titanium dioxide) lacquer prepared by the method of Example I and one pint of burnt umber lacquer, prepared by the method of Example I separately with stirring. The colored lacquers were prepared from the lacquer vehicle of Example XII.

The plurality of colored lacquers may be added to the carrier vehicle at the same time provided that the streams of lacquer are not permitted to meet before contact with the carrier vehicle in the tank.

The quantities of colored lacquer with respect to the carrier vehicle may be varied considerably to give varying multi-colored effects on the coated surface, so long as the viscosity of the resultant composition is low enough to permit application as by spraying. A suitable proportion is about 1–3 volumes of (combined) color lacquers to 20 volumes of carrier vehicle.

The following examples are presented to show typical variations in the film formers for both the internal and the external phase.

Example XIV

Illustrative of use of cellulose acetate butyrate in the internal phase.

A carrier vehicle is prepared containing:

| | Parts by weight |
|---|---|
| Xylol | 8.44 |
| High flash naphtha | 3.51 |
| Denatured alcohol | 7.90 |
| Toluol | 50.80 |
| Ketone aldehyde resin (Arochem 650) | 2.36 |
| Dibutyl phthalate | 4.07 |
| Cellulose acetate butyrate (EAB–381–20) | 1.17 |
| Cellulose acetate butyrate (EAB–381–½) | 8.08 |
| Plasticizing resin (alpha methyl styrene) | 10.16 |
| Butyl Cellosolve | 3.51 |
| | 100.00 |

A lacquer vehicle is prepared containing:

| | Parts by weight |
|---|---|
| Toluene | 35.00 |
| Denatured alcohol | 4.00 |
| Butyl alcohol | 4.00 |
| Cellulose acetate butyrate (EAB–171–2) | 8.00 |
| Amyl acetate | 4.00 |
| Dibutyl phthalate | 2.00 |
| Acetone | 35.00 |
| Butyl Cellosolve | 8.00 |
| | 100.00 |

Portions of the lacquer vehicle are suitably colored as for example by adding to separate 3 lb. portions thereof:
 a. 6 oz. of titanium dioxide yielding a white lacquer.
 b. 2 oz. of raw umber yielding a brown lacquer.
 c. 4 oz. of cadmium red yielding a red lacquer.
 d. 3 oz. of light chrome yellow plus 1 oz. of titanium dioxide yielding a light yellow lacquer.

When small similar amounts of lacquers *a* to *d* are poured into a quantity of the carrier vehicle which is being stirred a dispersion of differently colored particles is formed. This is a stable dispersion which when sprayed produces a pleasing multicolor coating of rather small particle size.

The small particle size is due in part to the low (2 second) viscosity of the cellulose acetate butyrate in the lacquer vehicle. Compositions having this small particle size are suitable for aerosol packaging, as for example by filling an aerosol container with about 65% of the composition and about 35% of propellant such as Freon 12 giving a pressure of about 38 p.s.i. at room temperature. It will be understood that the valve orifice must be carefully selected with reference to the particle size of the disperse phase. Also the amount and type of propellant can be varied to suitably regulate the pressure in accordance with the particle size, bearing in mind that increase in particle size requires increased pressure for optimum spray discharge.

Thus a practical limit is placed on the size of dispersed particles which can be handled in aerosol packaging of the composition both by the size of valve orifice available and by the safe limits of pressure within the aerosol container. It will be understood, however, that what has been said above concerning aerosol packaging applies to any composition in accordance with the present invention wherein the particle size of the disperse phase is sufficiently small.

In the composition as described in Example XIV larger particle sizes in the disperse phase can be obtained by using cellulose acetate butyrate of higher viscosity in the lacquer vehicle such as the 15 or 25 second viscosity (EAB–171–15) or (EAB–171–25) in place of or in combination with the 2 second viscosity (EAB–171–2).

*Example XV*

Illustrative of the use of chlorinated rubber film former in the external phase.

A carrier vehicle is prepared similar to that described in Example XIV but replacing the two cellulose acetate butyrate components with 9.25 parts by weight of chlorinated natural rubber film former of moderately high viscosity, "Parlon S20."

A lacquer vehicle is prepared containing:

| | Parts by weight |
|---|---|
| Toluol | 45.25 |
| Butyl alcohol | 1.37 |
| Butyl Cellosolve | 5.03 |
| Dibutyl phthalate | 3.23 |
| 5–6 second nitrocellulose, R.S. type (wet with with 30% isopropyl alcohol) | 7.57 |
| Isopropyl alcohol 99% | 8.25 |
| Amyl acetate | 2.32 |
| Methyl isobutyl ketone | 17.20 |
| Methyl ethyl ketone | 4.50 |
| Acetone | 5.28 |
| | 100.00 |

When portions of the lacquer vehicle are colored to provide colored lacquers and these added in separate streams to a stirred quantity of the carrier vehicle colored particles of disperse phase separate to form a composition having properties and spraying characteristics typical of compositions in accordance with the present invention.

The chlorinated rubber film former imparts a high surface tension to sprayed films of the multicolor coating composition which though desirable in certain applications might be objectionable when spraying non-rigid materials. This surface tension characteristic, however, can be modified by incorporating in the carrier vehicle a plasticizer or a supplementary film former of the acrylic resin or vinyl resin type.

Characteristically, the chlorinated rubber film former does not form as clear a solution as the cellulose acetate butyrate film former. The slight darkening of the continuous film presents no problem, however, when applying then coats of the composition or when employing coloring agent in the continuous phase.

*Example XVI*

Illustrative of acrylic resins as film formers in the external or continuous phase.

A lacquer vehicle is prepared containing:

| | Parts by weight |
|---|---|
| Xylol | 60 |
| High flash naphtha | 10 |
| Acrylic ester resin (Acryloid B–82) | 30 |
| | 100 |

When quantities of a lacquer vehicle as described in Example XV suitably colored are added to a stirred quantity of this carrier vehicle, a multicolor coating composition is obtained having well defined particles of disperse phase characteristic of the present invention and having good spraying characteristics.

With this particular formulation extended standing of the two-phase composition causes some tendency for particles of the disperse phase to adhere to each other. While this presents no problem if the formulation is to be used within a short time, it can be overcome by employing as the carrier vehicle a more complex mixture, such for example as the carrier vehicle composition described in Example XIV wherein the two cellulose acetate butyrate components are replaced by about 9.25 parts by weight of acrylic resin.

*Example XVII*

Illustrative of a multicolor coating composition adapted for baking to enhance the hardness thereof.

A lacquer vehicle is prepared containing:

| | Parts by weight |
|---|---|
| Xylol | 8.44 |
| High flash naphtha | 3.51 |
| Denatured alcohol | 7.90 |
| Toluol | 50.80 |
| Urea formaldehyde resin (American Cyanamid Beetle 220-8) | 7.44 |
| Dibutyl phthalate | 4.07 |
| Cellulose acetate butyrate (EAB-381-20) | 1.17 |
| Cellulose acetate butyrate (EAB-381-½) | 8.08 |
| Alpha methyl styrene resin | 5.08 |
| Butyl Cellosolve | 3.51 |
| | 100.00 |

When colored portions of a lacquer vehicle as described in Example XV are added to a stirred quantity of the foregoing carrier vehicle discrete colored particles separate to form a typical multicolor coating composition in accordance with the present invention.

When spray applied to surfaces this formulation forms a multicolor film which upon air drying is quite soft and flexible. When heated in an oven for about 20 minutes at 250° F. however the film becomes harder and somewhat brittle, due apparently to the curing of the urea formaldehyde resin.

It will, of course, be apparent that further modification of the carrier vehicle and/or lacquer vehicle to incorporate larger proportions of thermosetting resin would be desirable when it is intended to use the multicolor coating compositions in the finishing of rigid articles on which a hard baked finish is desired. For example, the alpha methyl styrene resin can be replaced with urea formaldehyde resin in addition to the 7.44 parts already included, bringing the total of urea formaldehyde resin up to 12.52 parts.

Various changes and modifications in the multicolor coating compositions and the procedures for preparing and utilizing the same as herein disclosed will occur to those skilled in the art, and to the extent that such changes and modifications are embraced by the appended claims, it is to be understood that they constitute part of my invention.

I claim:

1. The process for preparing two-phase anhydrous coating compositions that comprises preparing a carrier vehicle by dissolving a first film former, characterized as readily soluble in hydrocarbon solvent, in an organic solvent comprising a major proportion of hydrocarbon solvent, preparing a lacquer vehicle by dissolving a second film former, characterized as readily soluble in oxygenated lacquer solvent selected from the group consisting of ethers, ketones, alcohols and mixtures thereof and insoluble in hydrocarbon solvent, in an organic solvent comprising a mixture of oxygenated lacquer solvent selected from the group consisting of ethers, ketones, alcohols and mixtures thereof and an amount of hydrocarbon solvent which is insufficient to cause precipitation of said second film former, and adding said lacquer vehicle slowly to said carrier vehicle while agitating the same to thereby convert said lacquer vehicle to soft, pliable, discrete lacquer particles of irregular fibrous to flake-like contour dispersed in said carrier vehicle.

2. The process as defined in claim 1, wherein the size and shape of said lacquer particles is controlled by variation in at least one of the following: (a) speed of agitation of the carrier vehicle, (b) duration of agitation, (c) viscosity of the second film former, and (d) solids content of the lacquer vehicle, low viscosity in said second film former and high solids content in said lacquer vehicle tending to produce flake-like lacquer particles and high viscosity in said second film former and low solids content in said lacquer vehicle tending to produce fibrous lacquer particles.

3. The process as defined in claim 1, wherein at least one of said vehicles prior to mixing is colored and the color after said mixing remains with the film former originally in said vehicle.

4. The process as defined in claim 1 wherein the lacquer vehicle prior to mixing is colored and the color after said mixing is wholly within said dispersed lacquer particles.

5. The process as defined in claim 1 wherein a plurality of portions of lacquer vehicle differently characterized as to color are separately added to the agitated color vehicle thereby forming a dispersion of differently colored lacquer particles corresponding with said differently colored portions of lacquer vehicle.

6. An anhydrous film forming composition for use in the spray application of organic coatings providing a continuous organic film with discrete particles embedded therein, said composition consisting essentially of a carrier vehicle having dispersed therein soft, pliable, discrete lacquer particles of irregular fibrous to flake-like contour, said composition being prepared by the process as defined in claim 1.

7. An anhydrous film forming composition as defined in claim 6, wherein said lacquer particles are colored.

8. An anhydrous film forming composition as defined in claim 6, wherein said lacquer particles are a mixture of differently colored particles.

9. An anhydrous film forming composition as defined in claim 6, wherein said carrier vehicle is colored.

10. An anhydrous film forming composition as defined in claim 6, wherein the first film former in said carrier vehicle and the second film former in said lacquer particles have associated therewith compatible plasticizer and modifier components for imparting to the film formed from said composition the physical properties such as toughness, flexibility and hardness appropriate for the particular intended use of said composition.

11. A coating composition as defined in claim 6 wherein the first film former comprises cellulose acetate butyrate containing about 37% combined butyryl and 13% combined acetyl.

12. A coating composition as defined in claim 6 wherein the first film former comprises chlorinated natural rubber.

13. A coating composition as defined in claim 6 wherein the first film former comprises a polymerized ester of acrylic acid.

14. A coating composition as defined in claim 6 wherein the first film former comprises urea formaldehyde resin.

15. A coating composition as defined in claim 6 wherein the second film former comprises nitrocellulose having a nitrogen content of about 11.8 to 12.2%.

16. A coating composition as defined in claim 6 wherein the second film former comprises cellulose acetate butyrate containing about 17% combined butyryl and 29.5% combined acetyl.

17. A coating composition as defined in claim 6 wherein the first film former comprises cellulose acetate butyrate containing about 37% combined butyryl and 13% combined acetyl, and the second film former comprises nitrocellulose having a nitrogen content of about 11.8 to 12.2%.

18. A coating composition as defined in claim 6 wherein the first film former is a mixture of cellulose acetate butyrate, containing about 37% combined butyryl and 13% combined acetyl, with compatible plasticizer and modifier components, and the second film former is a mixture of nitrocellulose having a nitrogen content of about 11.8 to 12.2% with compatible plasticizer and modifier components.

19. A coating composition as defined in claim 6 wherein the first film former comprises cellulose acetate butyrate containing about 37% combined butyryl and 13% combined acetyl, and the second film former comprises cellulose acetate butyrate containing about 17% combined butyryl and 29.5% combined acetyl.

20. A coating composition as defined in claim 6 wherein the first film former comprises chlorinated natural rubber and the second film former comprises nitrocellulose having a nitrogen content of about 11.8 to 12.2%.

21. A coating composition as defined in claim 6 wherein the first film former comprises acrylic resin and the second film former comprises nitrocellulose having a nitrogen content of about 11.8 to 12.2%.

22. A coating composition as defined in claim 6 wherein the first film former comprises urea formaldehyde resin and the second film former comprises nitrocellulose having a nitrogen content of about 11.8 to 12.2%.

23. A coating composition as defined in claim 6 wherein the dispersed particles are of a size sufficiently small to pass through an aerosol spray nozzle, and said composition is associated with propellant in an aerosol container permitting intermittent use of said composition as an aerosol spray.

References Cited in the file of this patent

UNITED STATES PATENTS

| | | |
|---|---|---|
| 2,591,904 | Zola | Apr. 8, 1952 |
| 2,795,562 | Jud | June 11, 1957 |
| 2,809,119 | Lesser | Oct. 8, 1957 |

OTHER REFERENCES

Burrell: Organic Finishing, January 1956, pages 21–23.